US009966795B2

(12) United States Patent
Tseng et al.

(10) Patent No.: US 9,966,795 B2
(45) Date of Patent: May 8, 2018

(54) INTELLIGENT ELECTRIC GRID MANAGEMENT SYSTEM AND METHOD

(71) Applicant: ELECTRIC ENERGY EXPRESS CORPORATION, Hsinchu County (TW)

(72) Inventors: Ling-Yuan Tseng, Hsinchu (TW); Tze Tzung Chen, Taipei (TW); Mingfu Chu, Taitung County (TW)

(73) Assignee: Electric Energy Express Corporation, Zubei (TW)

( * ) Notice: Subject to any disclaimer, the term of this patent is extended or adjusted under 35 U.S.C. 154(b) by 371 days.

(21) Appl. No.: 14/861,029

(22) Filed: Sep. 22, 2015

(65) Prior Publication Data

US 2016/0099565 A1 Apr. 7, 2016

(30) Foreign Application Priority Data

Oct. 3, 2014 (TW) .............................. 103134640 A

(51) Int. Cl.
*H02J 1/10* (2006.01)
*H02J 3/46* (2006.01)
(Continued)

(52) U.S. Cl.
CPC ............ *H02J 13/0024* (2013.01); *H02J 3/14* (2013.01); *H02J 2003/143* (2013.01);
(Continued)

(58) Field of Classification Search
CPC .... H02J 13/0024; H02J 3/14; H02J 2003/143; Y04S 40/122; Y04S 20/242;
(Continued)

(56) References Cited

U.S. PATENT DOCUMENTS

| 6,356,426 B1 * | 3/2002 | Dougherty | ............. H02H 3/006 361/102 |
| 8,010,240 B2 * | 8/2011 | Mattiocco | ............. G06Q 10/06 700/295 |
| 2013/0320776 A1 * | 12/2013 | Cook | .................... H02J 13/002 307/126 |

FOREIGN PATENT DOCUMENTS

| TW | I423550 | 1/2014 |
| TW | I437835 | 5/2014 |

(Continued)

*Primary Examiner* — Richard Tan
(74) *Attorney, Agent, or Firm* — Rosenberg, Klein & Lee

(57) ABSTRACT

An intelligent electric grid management system and method includes at least one feeder line controller, which is arranged between a secondary power transforming station and at least one power supply feeder line to receive high voltage power and a control instruction from the secondary power transforming station and to store and set, in advance, digital code data of each power supply feeder line, a smart meter of a user end, appliance loads, and priority cutoff levels, a plurality of smart meters, which are each connected between the distribution line of each user end and at least one power feeder line, wherein the smart meter and the feeder line controller transmit therebetween a user end load ON/OFF control signal and a load state detection feedback signal through the power supply feeder line by means of the power line communication protocol; and a plurality of intelligent load receptacles, which are connected to the receptacle power line of the distribution line of the user end and the household appliance loads so that based on the power grid overall power requirement state and the priority cutoff level, the feeder line controller controls, through the smart meter by means of the power line communication protocol, each of the intelligent load receptacles to supply or cut off power to the household appliance load connected thereto.

7 Claims, 10 Drawing Sheets

(51) Int. Cl.
*H02J 13/00* (2006.01)
*H02J 3/14* (2006.01)

(52) U.S. Cl.
CPC ....... *Y02B 70/3225* (2013.01); *Y02B 70/3266* (2013.01); *Y02B 90/2623* (2013.01); *Y04S 20/222* (2013.01); *Y04S 20/242* (2013.01); *Y04S 40/122* (2013.01)

(58) Field of Classification Search
CPC .............. Y04S 20/222; Y02B 70/3266; Y02B 70/3225; Y02B 90/2623
USPC ......................................................... 307/24
See application file for complete search history.

(56) References Cited

FOREIGN PATENT DOCUMENTS

| | | |
|---|---|---|
| TW | I441409 | 6/2014 |
| TW | I442663 | 6/2014 |

\* cited by examiner

INTELLIGENT ELECTRIC GRID MANAGEMENT SYSTEM AND METHOD

BACKGROUND OF THE INVENTION

1. Field of the Invention

The present invention relates to an intelligent electric grid management system and method, and in particular to a system and a method that establish a digital code combination of a feeder line controller, a smart meter, and intelligent load receptacle and use power line communication to manage each load of a user end of an electric grid and set up the sequence of power supplying and cutting off power.

2. The Related Arts

Energy is one of the hottest topics of discussion throughout the entire world. People wish to obtain clean and safe energy or better renewable energy and no longer rely on fossil energy and nuclear energy that has potential risk. However, the power generation efficiency of the renewable energies is still very low and does not completely suits the needs of general consumers. For example, wind power generation is generally limited by seasonal winds and solar power generation is generally limited by weather so that the renewable energies that are limited by weather and time are hard to control and use. In such a period of time, the energy conservation principle of the limited electric power would become an important issue. The development of management techniques that allows for efficient and effective use of intelligent household appliances, smart meters, and intelligent electric grids that are derived from household appliances of user ends would be the best solution to ensure no undesired waste of electric power.

On the other hand, a conventional power supply and distribution system comprises a primary power transforming station, a secondary power transforming station, and power feeder lines. Power is supplied through the power supply lines and power distribution lines to a power distribution panel of each household user. The power feeder lines from the secondary power transforming station are each connected to a transformer that is mounted on a pole or installed as a road-side stand and the transformer is further connected to ten or more household user ends to supply AC single-phase three-line 220V, 60 Hz electric power to each household appliance load of each household user. When the power supply capacity of the entire electric grid and the required power consumption capacity get saturated or the supply and demand are no longer in balance, an emergence measure must be taken by supplying spare power capacity. When the spare power capacity is insufficient or the power consumption reaches a peak, the supply of power must be limited. In some countries, one possible solution is to first cut the power supply to the industrial users, and cutoff and limitation of power supply to the household users are the second step. Or alternatively, the supplies of power to the industrial users and the household users are cut off alternately. This would cause severe influence to certain loads that do not tolerate power supply being cut off. For example, a life support system for patients and a caring system for the elder would be severely affected. For user ends, the inconvenience and trouble would result due to power supply being cut off or limited. This solution that cuts off or limits power supply to the users, globally or locally, is not a radical measure for power capacity management of an electric grid and does not meet the needs for effectively managing power consumption capacity.

Related patent documents are known, such as Taiwan Patent I442663, which discloses an intelligent micro electric grid control and management system and an intelligent power consumption management method, wherein a telecommunication network and a cloud application management platform are involved to allow a user (a household user) to use a mobile phone or a computer, through the network or the cloud management platform, to self-manage household power consumption and supplying or cutting off power supplied to loads. This solution is a system and method that only allow the individual user to manage the user of electrical power by themselves and is not suitable for power consumption management for a large electric grid covered by a secondary power transforming station or a community based electric grid so that it does not help much for the power consumption of the entire electric grid, nor does it for power saving. Further, such a solution of using mobile phones and computers, through networks or cloud management platforms, to individually manage household power consumption and supplying or cutting of power supplied to loads is susceptible to hacker invasion of the networks and damage of the could management platform, leading to severe public security issue of power supply and undesired consequences.

Further, Taiwan Patent I441409 discloses a power monitor system, in which multiple power input energy sources are provided for manipulation of power consumption of individual loads of a single household electricity user. Similarly, load management can be done for individual electricity user and it is not possible to be applied to power consumption management and energy saving for an upper-level large electric grid or a community based electric grid. Further, a complicated control system involving individual computers, programmable logic controllers, and a central control panel must be used. Expansion to an entire power supply grid or a community based electric grid would cause an issue of cost and installation of facility and also an issue of being hard to integrate individual pieces of hardware equipment.

Further, Taiwan Patent I 423550 discloses an intelligent breaker integration management system, device, and intelligent distribution box, in which an intelligent breaker integration management system that is made up of a transformer, an electric meter, and an intelligent breaker integration management device is used to monitor and manage household loads of individual household users. In addition to such a complication arrangement, this system needs an operation unit to work with a plurality of breakers. Increasing the number of loads and load circuits would get beyond the capacity of the operation unit so that the entire set of the device must be replaced. Further, a power line communication device is involved, but only for carrying information of power consumption. For the entire equipment for use of power, the indoor wire arrangement system must be significantly changed. For example, the operation unit needs a plurality of control signal lines extending therefrom to be respectively connected to the breakers in order to transmit the control signals VC1-VCN. The greater the number of the loads controlled thereby is, the greater the number of the wires would be. For loads set up at different locations, wire laying is generally a difficult issue and may cause trouble for installation. Further, in case the number of the power supply load of the electricity supply circuits to which the breakers are connected is not one and is actually multiple, such as multiple sockets being connected to the same power supply circuit covered by one breaker, then cutting of power supply might cause overall power failure of certain important loads, such as life support systems and security systems and lead to undesired consequences. Further, such a management system suffers another problem that the system is only suitable for the control of loads of an individual household and cannot be expanded to an entire electric grid. Further, during power cutoff, there is no way to realize the importance level of individual loads or the priority of power cutoff. Simply relying on system power consumption information carried by the power line communication device might lead to consequences of risking the life safety of the users.

Further, Taiwan Patent I437835 discloses a power line network control system and method, in which device identification code is generated with random numbers and a process of broadcasting is taken to prevent repeating of the electric grid identification code and to handle the issue of division of control network. This allows for rough division of power control network, but cannot divide and recognize detail information related to power feeder lines, smart meters, and electric loads, making it not possible to achieve the effectiveness and need of true electric grid control for a true intelligent power consumption and loads.

SUMMARY OF THE INVENTION

The primary object of the present invention is to provide an intelligent electric grid management system and method, which help overcome the problem that the conventional electric grid or the electric grid power control system disclosed in the prior art documents is incapable of conducting control and management of power consumption monitoring and priority sequence of cutting off power supply or supplying electric power for each individual household user through a large electric grid that comprises a plurality power-supplying power feeder lines or a community based electric grid that is of the level of a secondary power transforming station that is at a higher level of an entire power supply grid and which provide the entire electric grid with the functions of automatic and fully digital code based intelligent management of power consumption capacity of the electric grid so as to achieve an effect of intelligent management of the power consumption of loads of the entire large electric grid or the community based electric grid.

Thus, the present invention provides an intelligent electric grid management system, which comprises:

at least one feeder line controller, which is arranged between a secondary power transforming station and at least one power supply feeder line to receive high voltage power and a control instruction from the secondary power transforming station and to store and set, in advance, digital code data of each power supply feeder line, a smart meter of a user end, appliance loads, and priority cutoff levels and to transmit user end load ON/OFF control signals and receive load state detection feedback signals by means of a power line communication protocol;

a plurality of smart meters, which are each connected between the distribution line of each user end and at least one power feeder line, wherein the smart meter and the feeder line controller transmit therebetween a user end load ON/OFF control signal and a load state detection feedback signal through the power supply feeder line by means of the power line communication protocol; and a plurality of intelligent load receptacles, which are connected to the receptacle power line of the distribution line of the user end and the household appliance loads so that based on the power grid overall power requirement state and the priority cutoff level, the feeder line controller controls, through the smart meter by means of the power line communication protocol, each of the intelligent load receptacles to supply or cut off power to the household appliance load connected thereto.

In the above intelligent electric grid management system according to the present invention, the feeder line controller comprises:

at least one high-voltage side power switch unit, which is connected to high voltage power supplied from the secondary power transforming station;

at least one transformer, wherein a high voltage side of the transformer is connected to the high-voltage side power switch unit to receive the high voltage power from the high-voltage side power switch unit;

at least one low-voltage side power switch unit, which is connected to a low voltage side of the transformer and the at least one power supply feeder line to control supply of low-voltage power from the low voltage side of the transformer to the power supply feeder line or to cut off the supply of the low-voltage power to the power supply feeder line;

at least one microprocessor, is connected to a controller of the secondary power transforming station to receive the control instruction from the secondary power transforming station and to store and set in advance digital code data of each power supply feeder line, the smart meter and electrical appliance of the user end, and household appliance load and priority cutoff level, and to provide a control instruction to the high voltage side power switch unit for supplying the high voltage power or cutting off the high voltage power; and at least one power line communication module, which is connected to the microprocessor, the high-voltage side power switch unit, and the low-voltage side power switch unit to provide necessary operation power to the microprocessor, the high-voltage side power switch unit, and the low-voltage side power switch unit and to receive a control instruction from the microprocessor in order to control the low-voltage side power switch unit to supply the low-voltage power to the power supply feeder line or not and to allow a load ON/OFF control signal of the user end to be transmitted through the power supply feeder line by means of the power line communication protocol and to receive a load state detection feedback signal from the power supply feeder line to the microprocessor.

In the above intelligent electric grid management system according to the present invention, the digital code data of each power supply feeder line, the smart meter of the user end, the appliance loads, and the priority cutoff level that is stored and set in advance in the feeder line controller has data fields including, in sequence, a secondary power transforming station code, a power supply feeder line serial number code, a smart meter brand/model code, a smart meter serial number code, a household appliance load priority cutoff level code, an intelligent load receptacle code, a household load model code, a household load serial number code, and a spare field.

In the above intelligent electric grid management system according to the present invention, the intelligent load receptacle comprises:

at least one power relay, which is connected to the household appliance load and the receptacle power line of the distribution line of the user end to supply power to the household appliance load or to cut off power supplied to the household appliance load; and at least one power microcontroller unit, which is connected to the receptacle power line of the distribution line of the user end and an excitation coil terminal of the power relay so as to receive, by means of the power line communication protocol, the user end load ON/OFF control signal transmitted from the smart meter to control the power relay to set ON for supplying power to the household appliance load or cutting off power supplied to the household appliance load, or to feed back, by means of the power line communication protocol, the load state detection feedback signal to the smart meter.

Further, in the intelligent electric grid management system according to the present invention, the power microcontroller unit of the intelligent load receptacle comprises:

at least one power line communication module, which is connected to the receptacle power line of the distribution line of the user end so as to receive, by means of the power line communication protocol, the user end load ON/OFF control signal transmitted from the smart meter or to feed back, by means of the power line communication protocol, the load state detection feedback signal to the smart meter;

at least one microprocessor, which is connected to the power line communication module to receive the user end load ON/OFF control signal transmitted from the smart meter and to transmit the load state detection feedback signal to the power line communication module;

at least one memory module, which stores, in advance, the digital code data of the household appliance load, which comprises data associated therewith, including the secondary power transforming station code, the power supply feeder line serial number code, the smart meter brand/model code, the smart meter serial number code, the household appliance load priority cutoff level code, the intelligent load receptacle code, the household load model code, and the household load serial number code to be supplied to the microprocessor as a reference for closing or opening the household appliance load; and at least one switch driver, which is connected to the microprocessor and the power relay to be controlled by the microprocessor for setting ON/OFF the power relay.

The present invention provides an intelligent electric grid management method, which comprises the following steps:

(a) starting;

(b) a power feeder line needing to reduce power consumption capacity? If yes, executing Step (c), and if no, repeating Step (a), where the secondary power transforming station supplies power according to actual demand, wherein if it needs to reduce the power consumption capacity of each power feeder line, then the secondary power transforming station transmits a control instruction to the feeder line controller to conduct a control of reducing power consumption capacity for the power feeder line connected to and controlled thereby;

(c) conducting calculation of reduction of power consumption capacity and determination of the priority cutoff level, wherein the feeder line controller of Step (b) follows the instruction issued by the secondary power transforming station for reduction of power consumption capacity to calculate the reduced capacity and determine the priority cutoff level, wherein if a lower level of the priority cutoff level has been used, the power consumption capacity of the secondary power transforming station is still short, then an upper level of the priority cutoff level would be set;

(d) transmitting through the power line communication protocol a priority power cutoff control instruction to a smart meter of each user end, wherein the feeder line controller of Step (c) transmits, through the power supply feeder line connected thereto by means of the power line communication protocol, a user end load power cutoff control signal to the smart meter of the user end; and (e) the smart meter of the associated user end performing an operation of cutting of power supply to a household appliance load corresponding to the determined priority cutoff level, wherein the smart meter of the user end of Step (d), based on the load power cutoff control signal of the user end transmitted from the power supply feeder line, transmits through the power line communication protocol a power cutoff control signal to the intelligent load receptacle of the user end so that based on the determined priority cutoff level, an intelligent load receptacle determines if to cut off the power supply to a household load connected thereto.

In the above intelligent electric grid management method according to the present invention, Step (e) further comprises the following steps:

(e1) the smart meter detecting and receiving a user end load power cutoff control signal, wherein the smart meter scans and thus receives the user end load power cutoff control signal transmitted from the feeder line controller through the power supply feeder line by means of the power line communication protocol;

(e2) determining if a household appliance load reaches the priority cutoff level? if yes, executing Step (e4) and if no, executing Step (e3), wherein the smart meter determines if there is a household appliance load reaches the priority cutoff level collectively based on a load state detection feedback signal transmitted back from the intelligent load receptacle connected thereto and the user end load power cutoff control signal transmitted from the feeder line controller in Step (e1);

(e3) the smart meter reporting a message to the feeder line controller, wherein the smart meter of Step (e2) transmits, through the power line communication protocol, the load state detection feedback signal from the intelligent load receptacle back to the feeder line controller of Step (e1);

(e4) determining, one by one, if the priority cutoff level of each of the intelligent load receptacles is greater than or equal to the priority cutoff level? if yes, executing Step (e5) and if no, executing Step (e7), wherein the intelligent load receptacles determine one by one, based on a secondary power transforming station code, a power supply feeder line serial number code, a smart meter brand/model code, a smart meter serial number code, a priority cutoff level code, an intelligent load receptacle code, a household load model code, and a household load serial number code that constitute digital code data loaded and stored therein in advance and the user end load power cutoff control signal that the feeder line controller transmits to the smart meter in Step (e1), if the priority cutoff levels of the intelligent load receptacles is greater than or equal to a household appliance load priority cutoff level set in the user end load power cutoff control signal of the feeder line controller;

(e5) cutting off power supply to the household appliance load connected to the intelligent load receptacle, wherein power supply to the household appliance load that is connected to the intelligent load receptacle that meets the priority cutoff level is cut off to temporarily shut down the supply of power;

(e6) transmitting information of the intelligent load receptacle back to the smart meter, wherein the state of the intelligent load receptacle to which power supply is cut off or power supply is resumed is transmitted through a load state detection feedback signal by means of the power line communication protocol back to the smart meter and repeating Step (e2); and (e7) the intelligent load receptacle continuously supplying power or resuming supply of power to the household appliance load, wherein when the household appliance load priority cutoff level of the digital code data that is stored in advance in the intelligent load receptacle is less than the priority cutoff level of Step (e4), power supply from a non-shut-down intelligent load receptacle to the household appliance load connected thereto is maintained or power supply to a household appliance load that is connected to an already-shut-down intelligent load receptacle is resumed and going on to Step (e6).

The efficacy of the intelligent electric grid management system and method according to the present invention is that a feeder line controller connected between a secondary power transforming station and a power supply feeder line, an smart meter arranged at a leading end of a user end distribution line, and an intelligent load receptacle that is connected to each receptacle power outlet of the user end distribution line are each provided with digital code data that is assigned with data fields including a secondary power transforming station code, a power supply feeder line serial number code, an smart meter brand/model code, an smart meter serial number code, a household appliance load power-supplying and power-cutting priority code, an intelligent load receptacle code, a household load model code, and a household load serial number code to serve as simulation of digital address such that each household appliance load is assigned with a unique power consumption address for identification of priority cutoff level of all the household appliance loads of each of the user ends covered by the secondary power transforming station, and a bidirectional communication mode is established with a power line communication protocol so that there is no need to install additional wireless or wired communication network and system and an existing power supply feeder line and an existing distribution line of a user end can be utilized to allow the secondary power transforming station to issue a straightforward instruction, based on the state of the supply of power and power consumption capacity and calculated priority cutoff level, to transmit a user end load power cutoff control signal to each smart meter and each intelligent load receptacle to which a household appliance load is connected to allow idle or less important household appliance loads that are supposed to be cut off power supply first to be cut off power supply automatically and quickly, whereby system communication facility and circuit costs can be greatly saved and the secondary power transforming station can achieve an effect of efficient and effective regulation and management of electric power. Further, for the user end, the influence of power cutoff does not cover all the household appliance loads so that there would be less influence on the daily living and no severe risk of life may be caused. Life support systems and aged person caring systems that are installed and operated in the user end are maintained with power supply. In addition, the present invention is applicable to the management of a large-scale electric grid composed of a plurality of secondary power transforming stations or a small-scale community-based grid power consumption capacity such that an optimum economic regulation and energy saving operation may be achieved, efficiently and effectively, for all scales of grid power consumption capacity covered by the secondary power transforming station without greatly increase power supply capacity or backup capacity, allowing for completely overcoming the drawbacks of the conventional or prior art electric grid control system and method that they are applicable only to individual household power consumption control or only good for completely shutting down power supply, and also for improving the application and industrial value of the present invention.

BRIEF DESCRIPTION OF THE DRAWINGS

The present invention will be apparent to those skilled in the art by reading the following description of preferred embodiments thereof, with reference to the attached drawings, wherein.

DETAILED DESCRIPTION OF THE PREFERRED EMBODIMENTS

Figure 1:
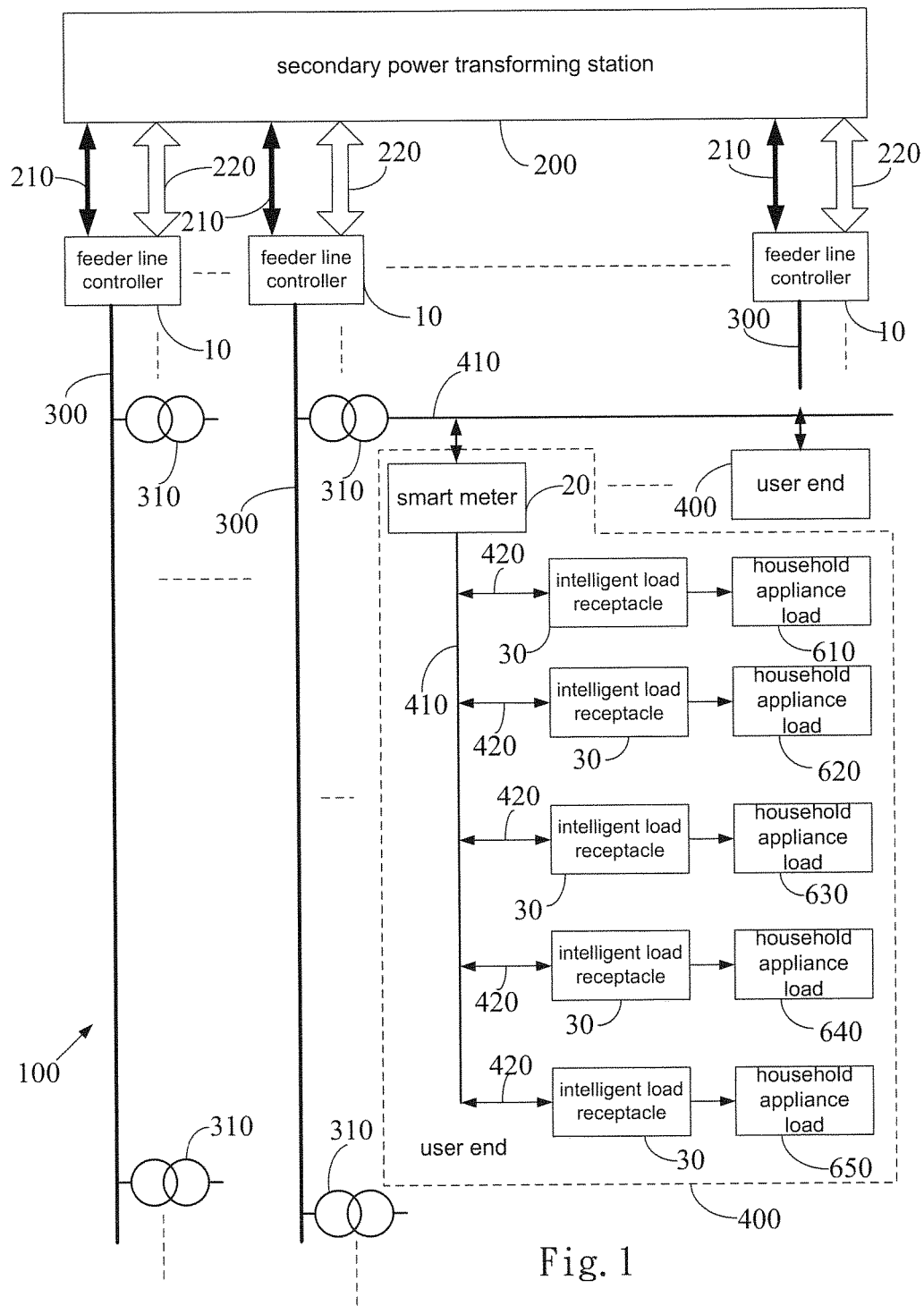
FIG. 1 is a block diagram of an intelligent electric grid management system according to the present invention.
Figure 2:
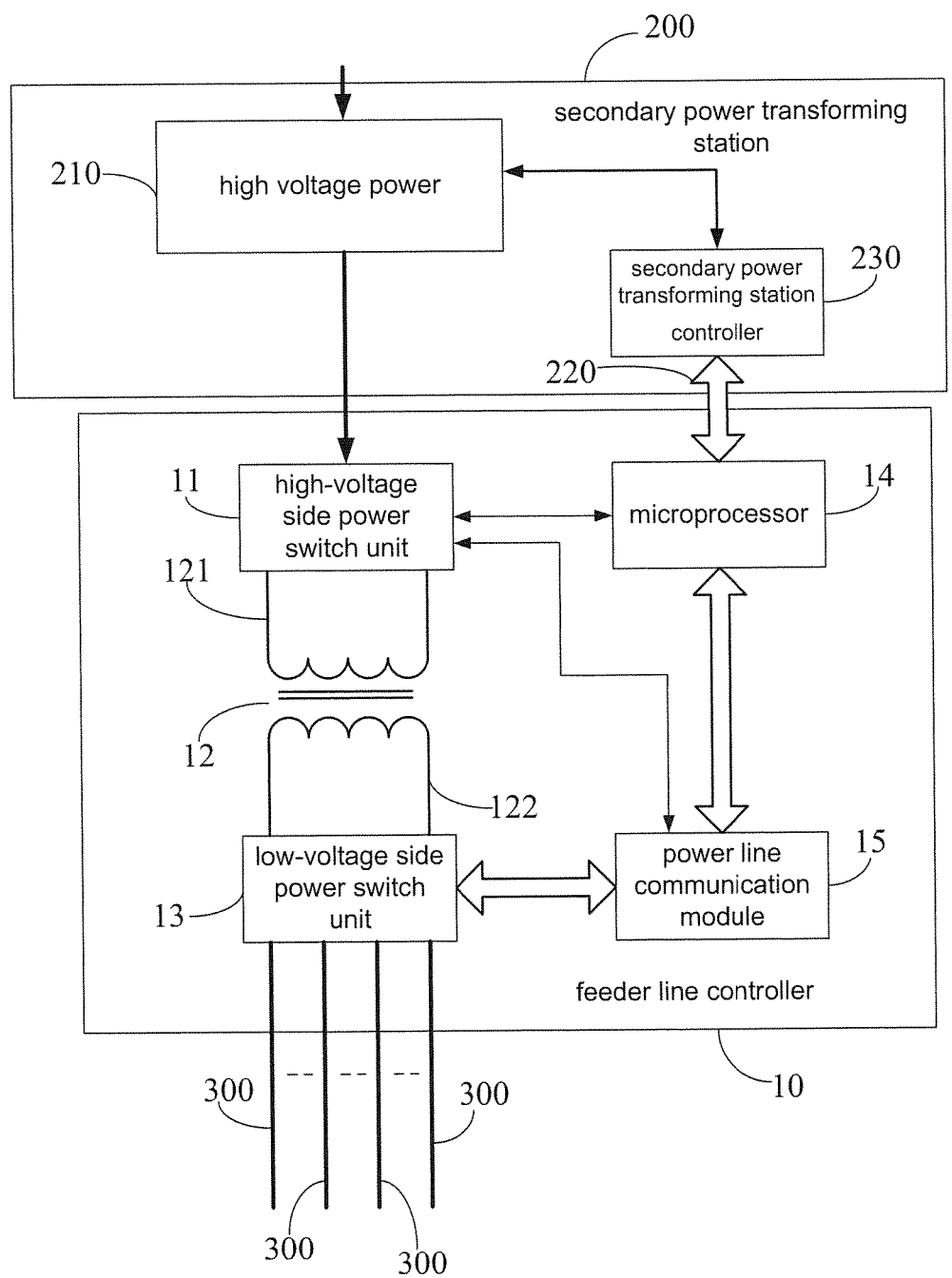
FIG. 2 is a circuit block diagram of a feeder line controller of the intelligent electric grid management system according to the present invention.
Figure 3:
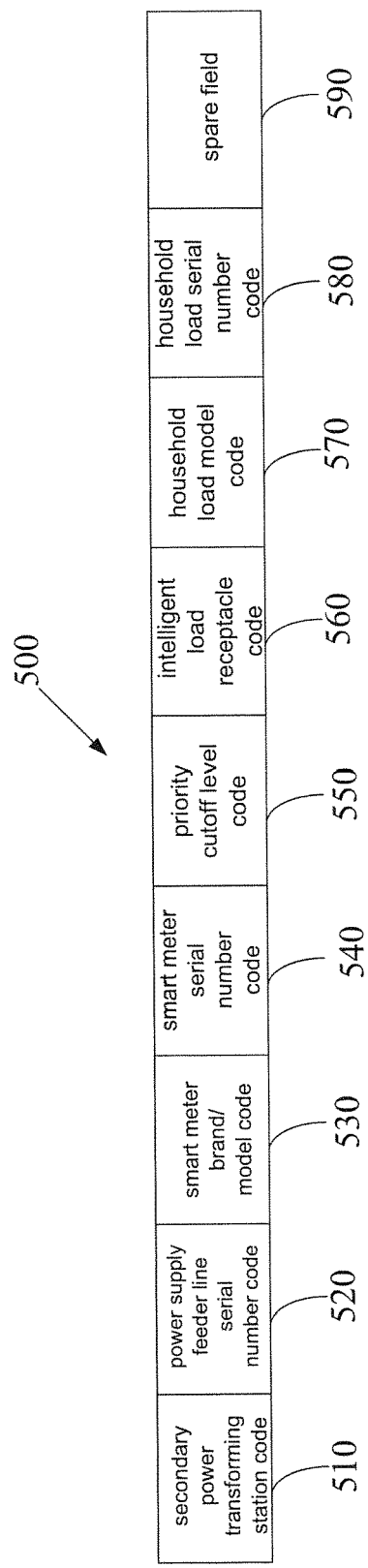
FIG. 3 is a schematic view illustrating fields of digital code data of the intelligent electric grid management system according to the present invention.

Referring to FIG. 1, the present invention provides an intelligent electric grid management system 100, which comprises at least one feeder line controller 10 arranged between a secondary power transforming station 200 and at least one power supply feeder line 300 to receive high voltage power 210 and a control instruction 220 from the secondary power transforming station 200 (as shown in FIG. 2) and to store and set, in advance, digital code data 500 of each power supply feeder line 300, a smart meter 20 of a user end 400, appliance loads 610, 620, 630, 640, and 650, and priority cutoff levels (as shown in FIG. 3) and to transmit user end load ON/OFF control signals and receive load state detection feedback signals by means of a power line communication protocol.

Referring additionally to FIG. 2, the feeder line controller 10 of the intelligent electric grid management system 100 according to the present invention is not limited to any specific circuit arrangement and in the present invention, an arrangement that comprises at least one high-voltage side power switch unit 11, at least one transformer 12, at least one low-voltage side power switch unit 13, at least one microprocessor 14, and at least one power line communication module 15 is illustrated as an example; however, other equivalent circuit structures that fall within the scope the present invention may also be used, wherein the high-voltage side power switch unit 11 is connected to the high voltage power 210 supplied from the secondary power transforming station 200. A high voltage side 121 of the transformer 12 is connected to the high-voltage side power switch unit 11 to receive the high voltage power 210 from the high-voltage side power switch unit 11. The low-voltage side power switch unit 13 is connected to a low voltage side 122 of the transformer 12 and the at least one power supply feeder line 300 to control supply of low-voltage power from the low voltage side 122 of the transformer 12 to the power supply feeder line 300 or to cut off the supply of the low-voltage power to the power supply feeder line 300. The high voltage power 210 supplied from the secondary power transforming station 200 is of a voltage of 22KV, which is transformed by the transformer 12 to step down to low-voltage power of 11KV, which is then supplied out via the power supply feeder line 300.

The microprocessor 14 is connected to the secondary power transforming station controller 230 of the secondary power transforming station 200 to receive the control instruction 220 of the secondary power transforming station 200. The control instruction 220 comprises power consumption capacity reservation and grid power consumption capacity. The microprocessor 14 stores and sets therein the digital code data 500 and provides a control instruction to the high voltage side power switch unit 11 for supplying the high voltage power 210 or cutting off the high voltage power 210.

The power line communication module 15 is connected to the microprocessor 14, the high-voltage side power switch unit 11, and the low-voltage side power switch unit 13 to provide necessary operation power to the microprocessor 12, the high-voltage side power switch unit 11, and the low-voltage side power switch unit 13 and to receive a control instruction from the microprocessor 14 in order to control the low-voltage side power switch unit 13 to supply the low-voltage power to the power supply feeder line 300 or not and to allow a load ON/OFF control signal of the user end 400 to be transmitted through the power supply feeder line 300 by means of the power line communication protocol and to receive a load state detection feedback signal from the power supply feeder line 300 to the microprocessor 12. The power line communication module 15 is not limited to any specific form and in the present invention, a G3-PLC module available from an American company, Maxim Integrated, is used as an example.

Referring to FIG. 3, data fields of the digital code data 500 include, in sequence, a secondary power transforming station code 510, a power supply feeder line serial number code 520, a smart meter brand/model code 530, a smart meter serial number code 540, a priority cutoff level code 550, an intelligent load receptacle code 560, a household load model code 570, a household load serial number code 580, and a spare field 590, wherein the priority cutoff level code 550 is not limited to any specific way of level setup and in the present invention, binary codes of five levels are taken as an example. Level one is the highest level bearing a code of "001", which is provided for not cutting off power and limiting power supply, such as a life support device, a security system, a fire detection system, a water pump, or an aged citizen caring system; level 2 is set for household electrical appliance related to living and heath, such as an electrical water heater, a massage chair, or an electric exercise device, bearing a code of "010"; level 3 refers to household electrical appliances of which power supply can be cut off in a general condition, such as air-conditioner or a heater, bearing a code of "011"; level 4 refers to household electrical appliance having no significant influence on living, such as a television set, a washing machine, and drying machine, bearing a code of "100"; and level 5 refers to household electric appliances that are generally in idle, such as a microwave oven and a bake oven, bearing a code of "101". The division of the levels of the priority cutoff level code 550 can be determined according to a contract executed between and/or modified by the power company associated with the secondary power transforming station 200 and the user end 400. The secondary power transforming station code 510, the power supply feeder line serial number code 520, the smart meter brand/model code 530, the smart meter serial number code 540, the priority cutoff level code 550, the intelligent load receptacle code 560, the household load model code 570, the household load serial number code 580, and the spare field 590 that are described above are not limited to any specific form of coding, which can be a form of simulated digital address constituted by means of decimal code or binary code or hexadecimal code.

A plurality of smart meters 20 are each connected between the distribution line 410 of each user end 400 and at least one power feeder line 300. The smart meter 20 is arranged at a front end of the distribution line 410 and a rear end of the power feeder line 300 and voltage stepping down is performed with a transformer 310 that is mounted on a pole or installed as a road-side stand for connection with the smart meter 20, so that the 11KV voltage of the power feeder line 300 can be reduced to for example 220V/110V household voltage supplied to the distribution line 410. Further, the smart meter 20 and the feeder line controller 10 may transmit therebetween a user end load ON/OFF control signal and a load state detection feedback signal through the power supply feeder line 300 by means of the power line communication protocol. The mode of transmission can be bidirectional reversible transmission.

A plurality of intelligent load receptacles 30 are connected to the receptacle power line 420 of the distribution line 410 of the user end 400 and the household appliance loads 610, 620, 630, 640, 650 so that based on the power grid overall power requirement state and the priority cutoff level, the feeder line controller 10 transmits, through the smart meter 20 by means of the power line communication protocol, the user end load ON/OFF control signal in order to control each of the intelligent load receptacles 30 to supply or cut off power to the household appliance load 610, 620, 630, 640, 650 connected thereto. The numbers of the intelligent load receptacles 30 and the household appliance loads 610, 620, 630, 640, 650 that are connected to the distribution line 400 of each of the user ends 400 are not limited to any specific numbers and in the present invention, five household appliance loads 610, 620, 630, 640, 650 are shown an example.

Figure 4:
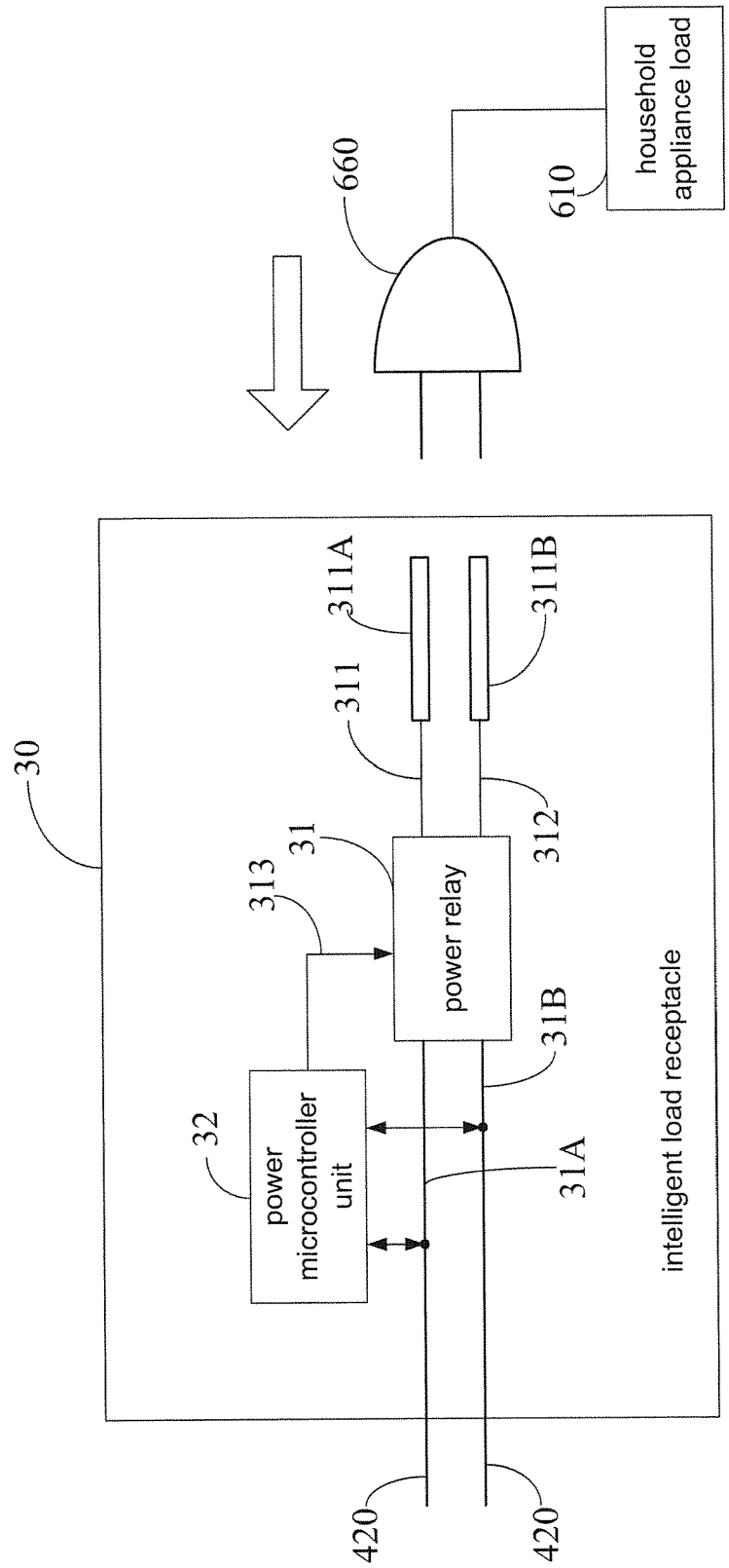
FIG. 4 is a circuit block diagram of an intelligent load receptacle of the intelligent electric grid management system according to the present invention.
Figure 5:
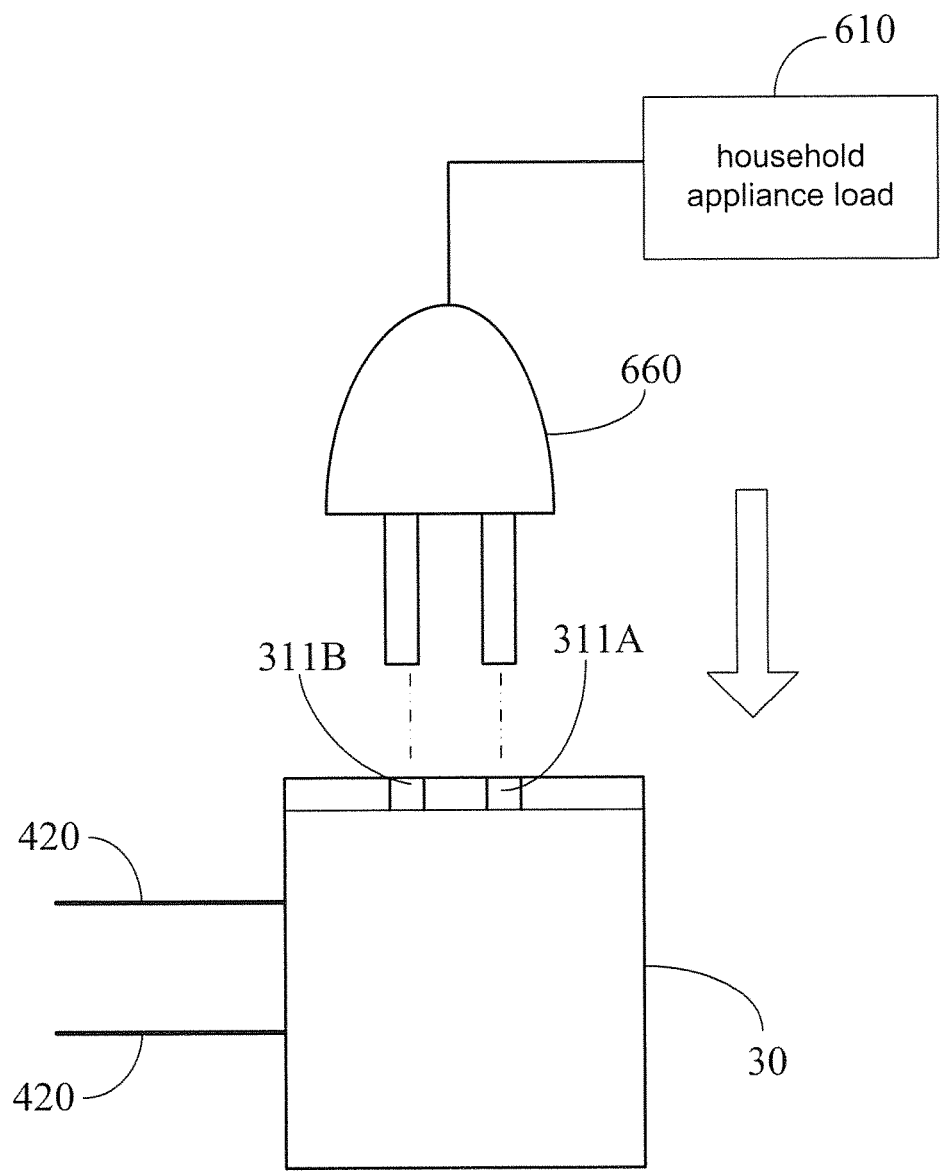
FIG. 5 is a schematic view illustrating the connection between the intelligent load receptacle of the intelligent electric grid management system according to the present invention and a household appliance load.

Referring to FIGS. 4 and 5, the structure of the intelligent load receptacle 30 of the intelligent electric grid management system 100 according to the present invention is not limited to any specific form and in the present invention, one that comprises at least one power relay 31 and at least one power microcontroller unit 32 is taken as an example, wherein power terminals 31A, 31B of the power relay 31 are connected to the receptacle power line 420 of the distribution line 410 of the user end 400 and a pair of contact terminals 311, 312 of the power relay 31 are respectively connected to a pair of insertion slots 311A, 311B to allow a power plug 660 of the household appliance load 610, 620, 630, 640, 650 to insert into and connect to the insertion slots 311A, 311B (as shown in FIG. 5), so that through the power relay being set ON, power is supplied from the receptacle power line 420 to the household appliance load 610, 620, 630, 640, or 650 or being set OFF, power supplied to the household appliance load 610, 620, 630, 640, or 650 is cut off. The power microcontroller unit 32 is connected to the receptacle power line 420 of the distribution line 410 of the user end 400 and an excitation coil terminal 313 of the power relay 31 so as to receive, by means of the power line communication protocol, the user end load ON/OFF control signal transmitted from the smart meter 20 to control the power relay 31 to set ON for supplying power to the household appliance load 610, 620, 630, 640, or 650 or cutting off power supplied to the household appliance load 610, 620, 630, 640, or 650, or to feed back, by means of the power line communication protocol, the load state detection feedback signal to the smart meter 20.

Figure 6:
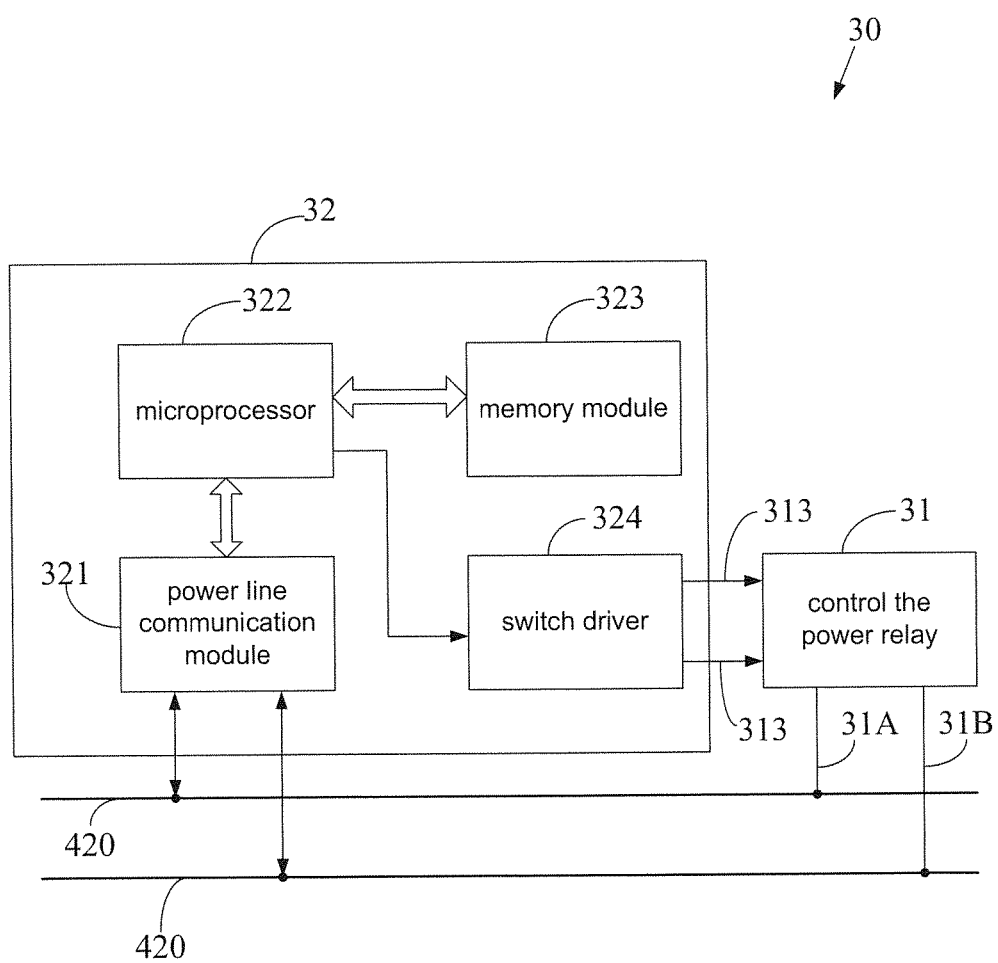
FIG. 6 is a circuit block diagram of a microcontroller of the intelligent load receptacle of FIG. 4.

Referring to FIG. 6, the power microcontroller unit 32 of the intelligent load receptacle 30 of FIG. 4 is not limited to any specific structure and in the present invention, one that comprises at least one power line communication module 321, at least one microprocessor 322, at least one memory module 323, and at least one switch driver 324 is taken as an example, wherein the power line communication module 321 is connected to the receptacle power line 420 of the distribution line 410 of the user end 400 so as to receive, by means of the power line communication protocol, the user end load ON/OFF control signal transmitted from the smart meter 20 or to feed back, by means of the power line communication protocol, the load state detection feedback signal to the smart meter 20.

The microprocessor 322 is connected to the power line communication module 321 to receive the user end load ON/OFF control signal transmitted from the smart meter 20 and to transmit the load state detection feedback signal to the power line communication module 321. The memory module 323 is not limited to any specific form and in the present invention, one that comprises electrically erasable programmable read-only-memory (EEPROM) is taken as an example, in which the digital code data 500 of the household appliance load 610, 620, 630, 640, or 650 is loaded and stored to supply to the microprocessor 322 as a reference for closing or opening the household appliance load 610, 620, 630, 640, or 650. The switch driver 324 is connected to the microprocessor 322 and the excitation coil terminal 313 of the power relay 321 to be controlled by the microprocessor 322 for setting ON/OFF the power relay 31.

Figure 7:
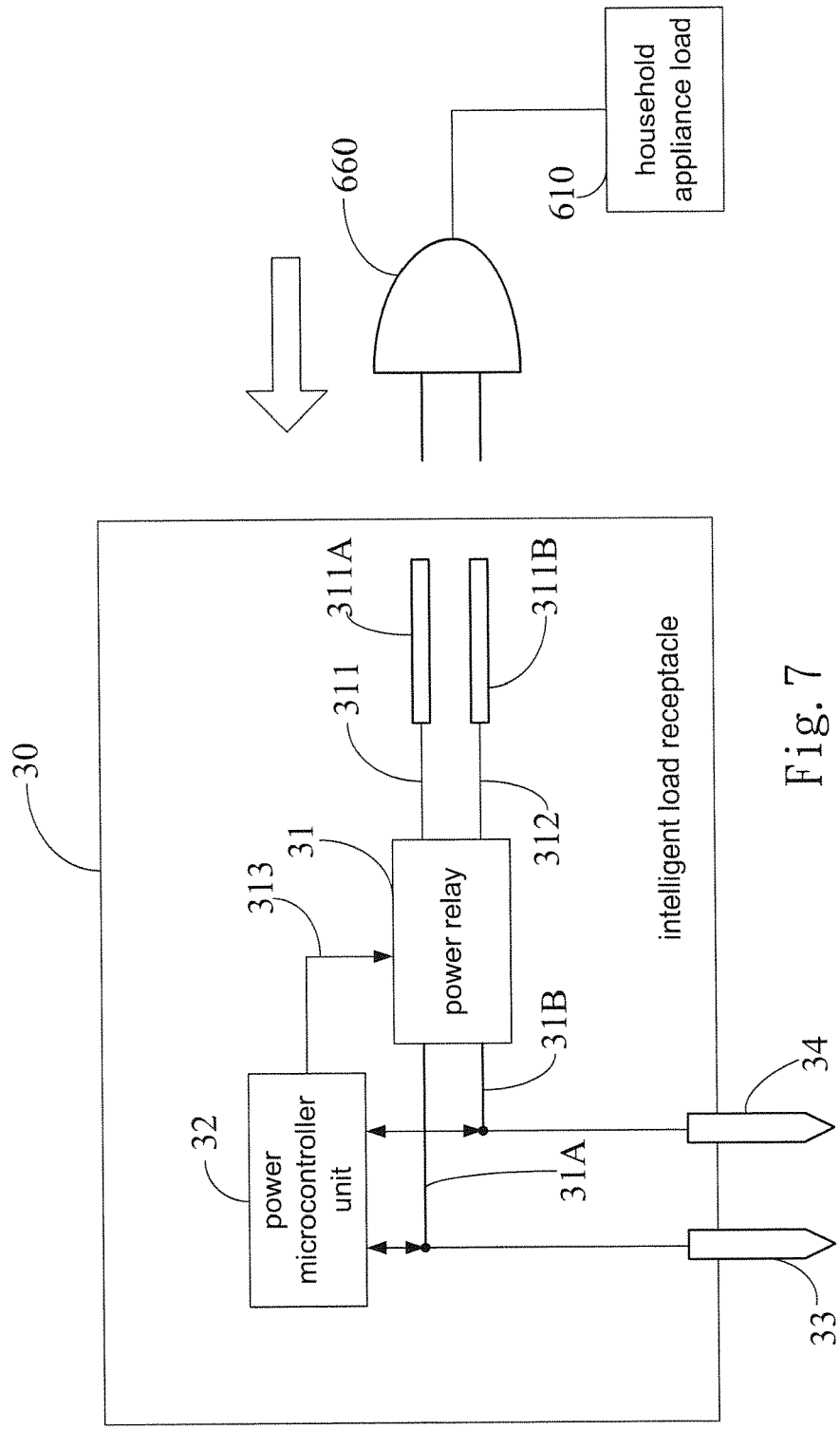
FIG. 7 illustrates another embodiment of the intelligent load receptacle of the intelligent electric grid management system according to the present invention.
Figure 8:
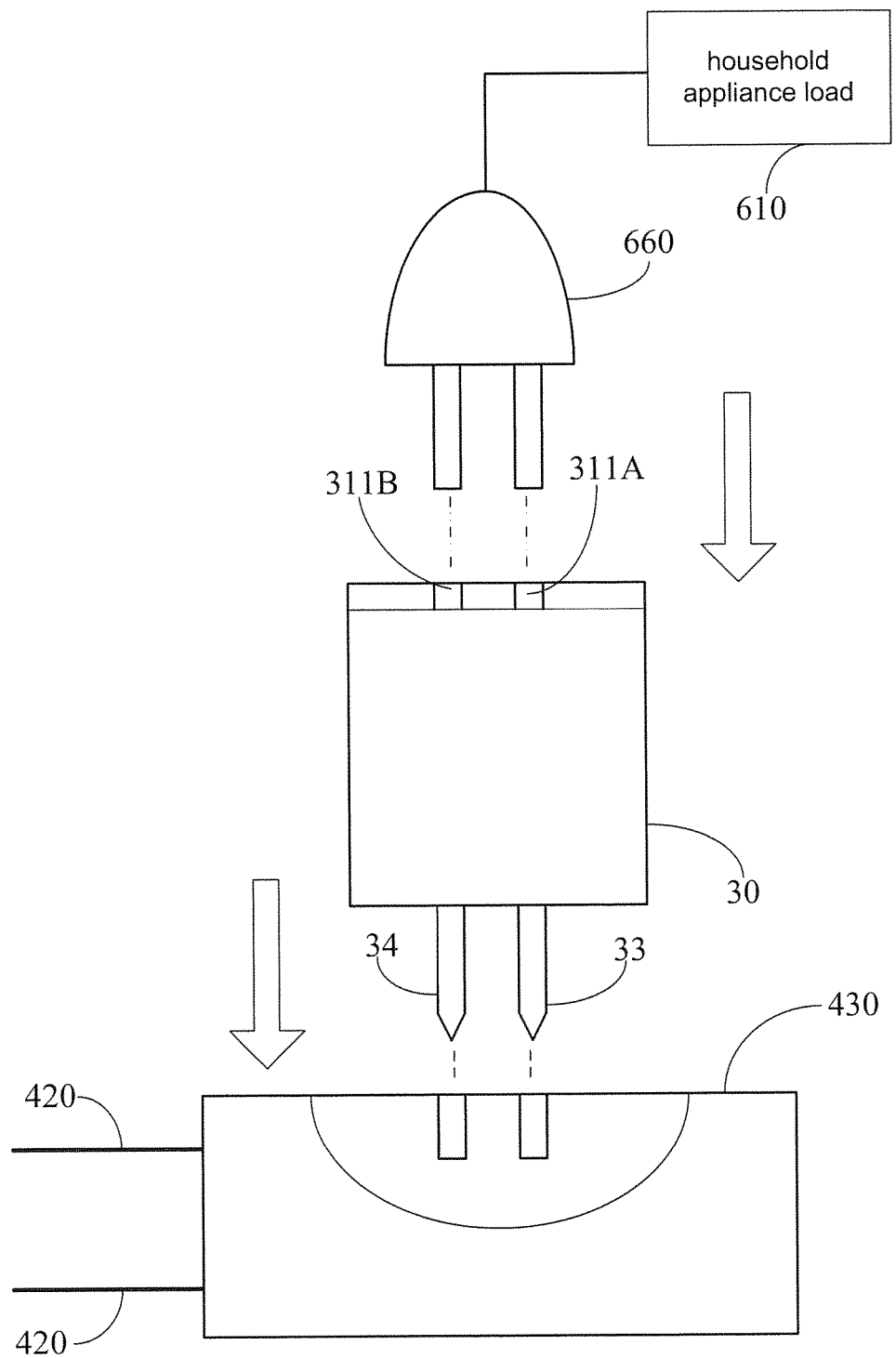
FIG. 8 is a schematic view illustrating connection among the intelligent load receptacle of FIG. 7 and a power receptacle and a household appliance load.

Referring to FIGS. 7 and 8, another embodiment of the intelligent load receptacle 30 of the intelligent electric grid management system 100 according to the present invention is provided, wherein a pair of power blades 33, 34 is shown connected to the power terminals 31A, 31B of the power relay 31 and the power microcontroller unit 32, so that the power blades 33, 34 may be inserted into the power receptacle 430 that is connected to the receptacle power line 420 of the distribution line 410 of the user end 400 (as shown in FIG. 8) to allow the power relay 31 and the power microcontroller unit 32 to receive power from the receptacle power line 420 of the distribution line 410. The power receptacle 430 can be an indoor wall outlet or an extension cord outlet so that the intelligent load receptacle 30 can be applied to the power receptacle 430 in a flexible manner without modifying the configuration and arrangement of the indoor power outlet to achieve the same control of supplying or cutting off power supplied to the household appliance load 610, 620, 630, 640, or 650 connected thereto, similar to what described above.

Figure 9:
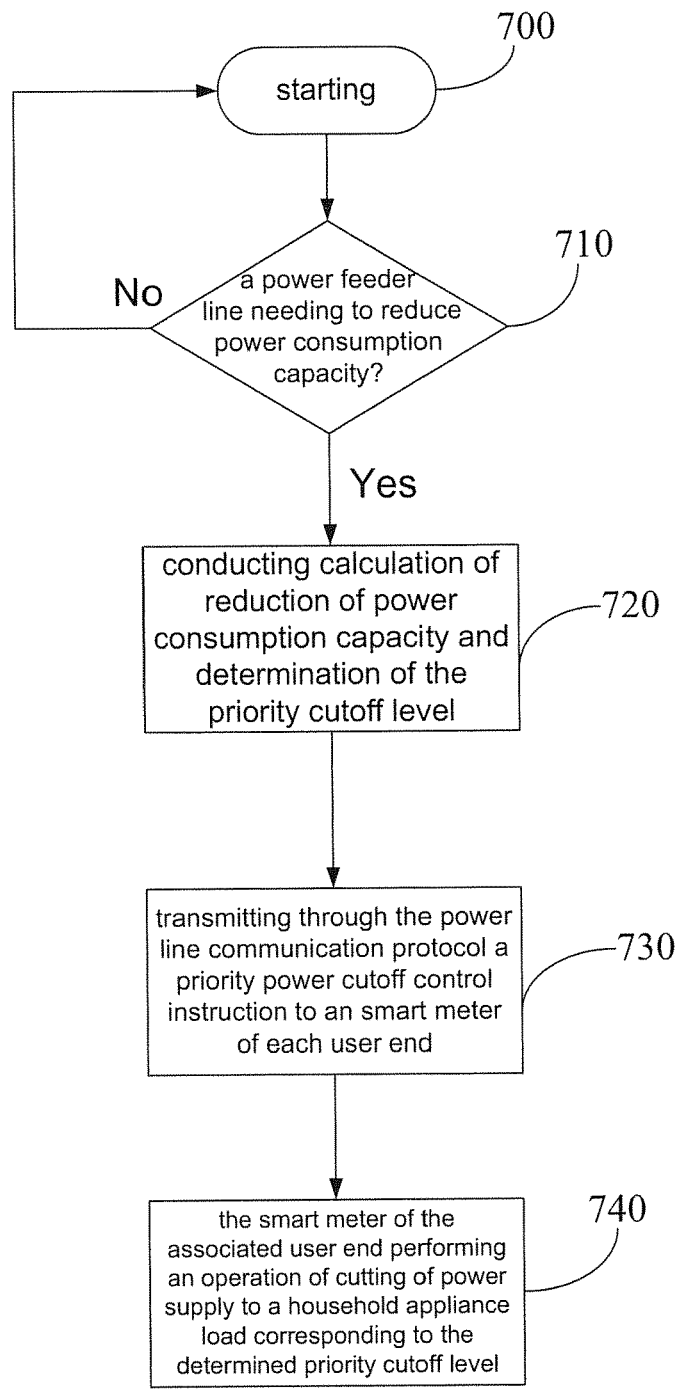
FIG. 9 is a flow chart illustrating an intelligent electric grid management method according to the present invention.

Referring to FIG. 9, which is a flow chart illustrating an intelligent electric grid management method according to the present invention, the method comprises Steps 700-740, wherein:

(700) starting;

(710) a power feeder line needing to reduce power consumption capacity? If yes, executing Step (720), and if no, repeating Step (700), where the secondary power transforming station 200 supplies power according to actual demand, wherein if it needs to reduce the power consumption capacity of each power feeder line, then the secondary power transforming station 200 transmits a control instruction 220 to the feeder line controller 10 to conduct a control of reducing power consumption capacity for the power feeder line 300 connected to and controlled thereby;

(720) conducting calculation of reduction of power consumption capacity and determination of the priority cutoff level, wherein the feeder line controller 10 of Step (710) follows the instruction issued by the secondary power transforming station 200 for reduction of power consumption capacity to calculate the reduced capacity and determine the priority cutoff level, wherein if a lower level of the priority cutoff level has been used, the power consumption capacity of the secondary power transforming station 200 is still short, then an upper level of the priority cutoff level would be set;

(730) transmitting through the power line communication protocol a priority power cutoff control instruction to a smart meter of each user end, wherein the feeder line controller 10 of Step (710) transmits, through the power supply feeder line 300 connected thereto by means of the power line communication protocol, a user end load power cutoff control signal to the smart meter of the user end; and (740) the smart meter of the associated user end performing an operation of cutting of power supply to a household appliance load corresponding to the determined priority cutoff level, wherein the smart meter 20 of the user end 400 of Step (730), based on the load power cutoff control signal of the user end 400 transmitted from the power supply feeder line 300, transmits through the power line communication protocol a power cutoff control signal to the intelligent load receptacle 30 of the user end 410 so that based on the determined priority cutoff level, an intelligent load receptacle 30 determines if to cut off the power supply to a household load 610, 620, 630, 640, or 650 connected thereto.

Figure 10:
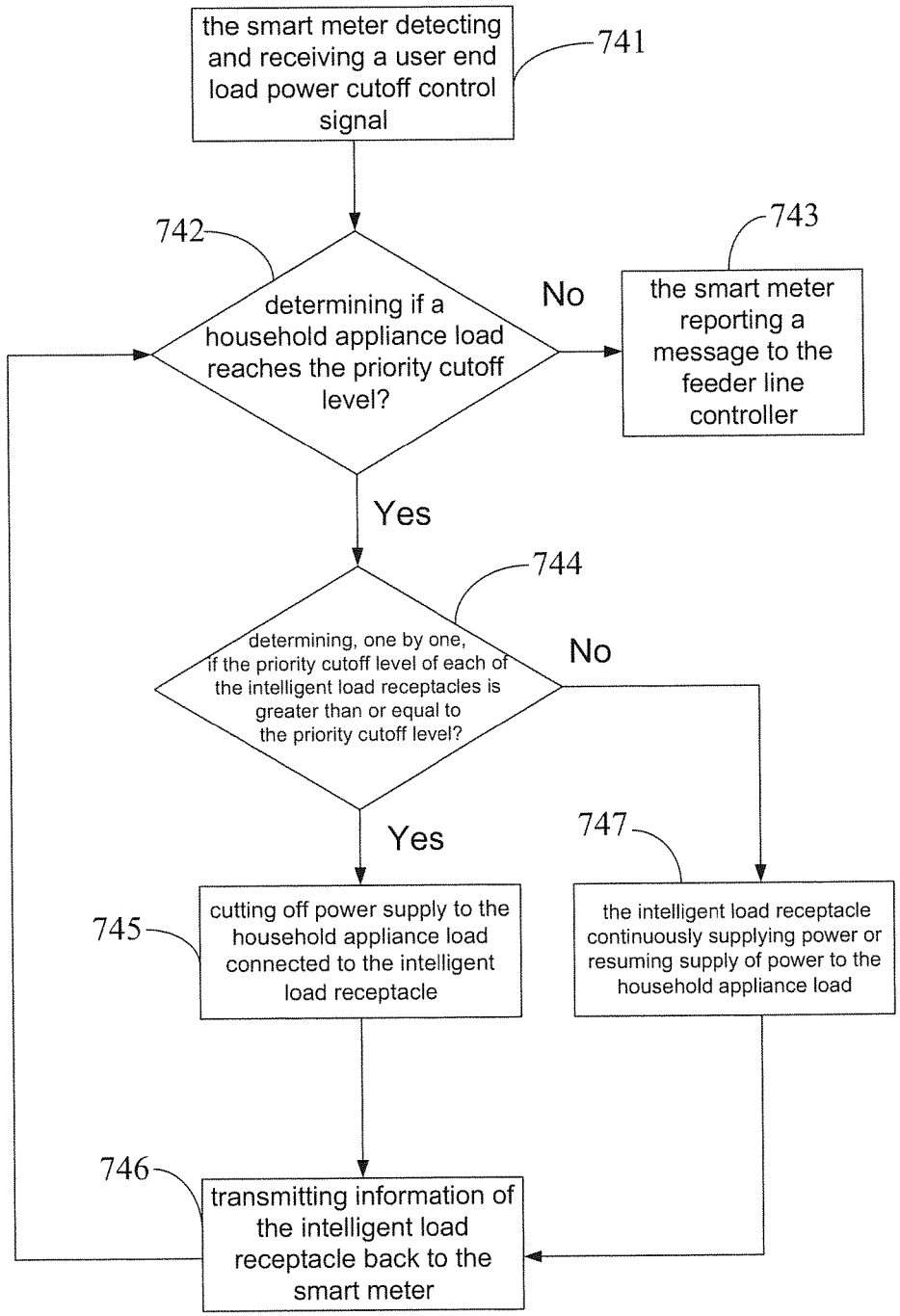
FIG. 10 is a flow chart illustrating a process of priority power cutoff and power supply resumption of smart meters and intelligent load receptacles of each user end performed in the intelligent electric grid management method according to the present invention.

Referring to FIG. 10, a flow chart is given to illustrate a process of priority power cutoff and power supply resumption of smart meters and intelligent load receptacles of each user end performed in the intelligent electric grid management method according to the present invention, which comprises Steps 741-747, wherein:

(741) the smart meter detecting and receiving a user end load power cutoff control signal, wherein the smart meter 20 periodically scans at an interval of 15 seconds and thus receives the user end load power cutoff control signal transmitted from the feeder line controller 10 through the power supply feeder line 300 by means of the power line communication protocol;

(742) determining if a household appliance load reaches the priority cutoff level? if yes, executing Step (744) and if no, executing Step (743), wherein the smart meter 20 determines if there is a household appliance load 610, 620, 630, 640, or 650 reaches the priority cutoff level collectively based on a load state detection feedback signal transmitted back from the intelligent load receptacle 30 connected thereto and the user end load power cutoff control signal transmitted from the feeder line controller 10 in Step (741);

(743) the smart meter reporting a message to the feeder line controller, wherein the smart meter 20 of Step (742) transmits, through the power line communication protocol, the load state detection feedback signal from the intelligent load receptacle 30 back to the feeder line controller 10 of Step (741);

(744) determining, one by one, if the priority cutoff level of each of the intelligent load receptacles is greater than or equal to the priority cutoff level? if yes, executing Step (745) and if no, executing Step (747), wherein the intelligent load receptacles 30 determine one by one, based on a secondary power transforming station code 510, a power supply feeder line serial number code 520, a smart meter brand/model code 530, a smart meter serial number code 540, a priority cutoff level code 550, an intelligent load receptacle code 560, a household load model code 570, and a household load serial number code 580 that constitute digital code data 500 loaded and stored therein in advance and the user end load power cutoff control signal that the feeder line controller 10 transmits to the smart meter 20 in Step (741), if the priority cutoff levels of the intelligent load receptacles 30 is greater than or equal to a household appliance load priority cutoff level set in the user end load power cutoff control signal of the feeder line controller 10;

(745) cutting off power supply to the household appliance load connected to the intelligent load receptacle, wherein power supply to the household appliance load 610, 620, 630, 640, or 650 that is connected to the intelligent load receptacle 30 that meets the priority cutoff level is cut off to temporarily shut down the supply of power;

(746) transmitting information of the intelligent load receptacle back to the smart meter, wherein the state of the intelligent load receptacle 30 to which power supply is cut off or power supply is resumed is transmitted through a load state detection feedback signal by means of the power line communication protocol back to the smart meter 20 and repeating Step (742); and (747) the intelligent load receptacle continuously supplying power or resuming supply of power to the household appliance load, wherein when the household appliance load priority cutoff level of the digital code data 500 that is stored in advance in the intelligent load receptacle 30 is less than the priority cutoff level of Step (744), power supply from a non-shut-down intelligent load receptacle 30 to the household appliance load 610, 620, 630, 640, or 650 connected thereto is maintained or power supply to a household appliance load 610, 620, 630, 640, or 650 that is connected to an already-shut-down intelligent load receptacle 30 is resumed and going on to Step (746).

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An intelligent electric grid management system, comprising:
   at least one feeder line controller electrically connected between a secondary power transforming station and at least one power supply feeder line to receive high voltage power and a control instruction from the secondary power transforming station, the at least one feeder line controller storing and setting, in advance, digital code data of the at least one power supply feeder line, user end smart meters, appliance loads, and priority cutoff levels, the at least one feeder line controller transmitting user end load ON/OFF control signals and receiving load state detection feedback signals via a power line communication protocol;
   a plurality of smart meters, each of the plurality of smart meters being coupled between a distribution line of a corresponding user end and the at least one power supply feeder line, wherein the at least one feeder line controller transmits the user end load ON/OFF control signals and each of the plurality of smart meters transmits a respective load state detection feedback signal through the at least one power supply feeder line to the at least one feeder line controller; and
   a plurality of intelligent load receptacles coupled to the plurality of smart meters, respective portions of the plurality of intelligent load receptacles being coupled to each of the plurality of smart meters, each respective portion of the plurality of intelligent load receptacles being coupled to the distribution line of the corresponding user end through a respective one of a plurality of receptacle power lines, each respective portion of the plurality of intelligent load receptacles being connected to household appliance loads, wherein the at least one feeder line controller controls, through the plurality of smart meters, each of the plurality of intelligent load receptacles to supply or cut off power to the household appliance loads connected to each respective portion of the plurality of intelligent load receptacles responsive to a power requirement state of an associated power grid and the stored priority cutoff levels, each of the plurality of intelligent load receptacles stores, in advance, data of the household appliance loads in a field of the digital code data, the digital code data has data fields including a secondary power transforming station code, a power supply feeder line serial number code, a smart meter brand/model code, a smart meter serial number code, a household appliance load priority cutoff level code, an intelligent load receptacle code, a household load model code, and a household load serial number code.

2. The intelligent electric grid management system as claimed in claim 1, wherein the at least one feeder line controller comprises:
   at least one high-voltage side power switch unit connected to high voltage power supplied from the secondary power transforming station;
   at least one transformer having a high voltage side and a low voltage side, the high voltage side of the transformer being connected to the high-voltage side power switch unit to receive the high voltage power from the high-voltage side power switch unit;
   at least one low-voltage side power switch unit connected to the low voltage side of the transformer and the at least one power supply feeder line to supply low-voltage power from the low voltage side of the transformer to the at least one power supply feeder line or to cut off the supply of the low-voltage power to the at least one power supply feeder line;
   at least one microprocessor coupled to a controller of the secondary power transforming station to receive the control instruction therefrom for storing and setting the digital code data, the at least one microprocessor being coupled to the at least one high-voltage side power switch unit and sends, a second control instruction thereto for supplying or cutting off the high voltage power to the at least one transformer; and at least one power line communication module connected to the at least one microprocessor, the at least one high-voltage side power switch unit, and the at least one low-voltage side power switch unit to provide necessary operation power thereto, the at least one power line communication module controls and the at least one low-voltage side power switch unit responsive to receipt of a third control instruction transmitted from the microprocessor in order to supply or cut off the low-voltage power to the at least one power supply feeder line and to allow the user end load ON/OFF control signals to be transmitted through the at least one power supply feeder line and to receive the load state detection feedback signals from the at least one power supply feeder line for transmission to the at least one microprocessor.

3. The intelligent electric grid management system as claimed in claim 1, wherein the digital code data has further includes a spare data field.

4. The intelligent electric grid management system as claimed in claim 1, wherein each of the plurality of intelligent load receptacles comprises:
   at least one power relay connected to a corresponding household appliance load and the respective receptacle power line of the distribution line of the corresponding user end; and
   at least one power microcontroller unit connected to the respective receptacle power line of the distribution line of the corresponding user end and an excitation coil terminal of the at least one power relay so as to receive the user end load ON/OFF control signals transmitted from a corresponding one of the plurality of smart meters to control the at least one power relay to set ON for supplying power to the corresponding household appliance load or cutting off power supplied to the corresponding household appliance load, or to feedback the load state detection feedback signals to the smart meter.

5. The intelligent electric grid management system as claimed in claim 4, wherein the at least one power microcontroller unit of each of the plurality of intelligent load receptacles comprises:
   at least one power line communication module connected to the respective receptacle power line of the distribution line of the corresponding user end so as to receive the user end load ON/OFF control signals transmitted from the corresponding one of the plurality of smart meters or to feedback the load state detection feedback signals to the corresponding one of the plurality of smart meters;
   at least one microprocessor, which is connected to the power line communication module to receive the user end load ON/OFF control signals transmitted from the corresponding one of the plurality of smart meters and to transmit the load state detection feedback signals to the at least one power line communication module;
   at least one memory module, which stores, in advance, the data of the household appliance loads in corresponding fields of the digital code data, the digital data being supplied to the at least one microprocessor as a reference for closing or opening the corresponding household appliance load; and
   at least one switch driver connected to the at least one microprocessor and the at least one power relay to be controlled by the at least one microprocessor for setting ON/OFF the at least one power relay.

6. The intelligent electric grid management system as claimed in claim 4, wherein a pair of power blades is respectively connected to a pair of power terminals of the at least one power relay of at least one of the plurality of intelligent load receptacles and the at least one power microcontroller unit, so that the power blades are insertable into a power receptacle that is connected to another of the plurality of receptacle power lines of the distribution line of the corresponding user end.

7. An intelligent electric grid management method of a power system including a secondary power transforming station supplying power to a multiplicity of power feeder lines, the method comprising:
   providing at least one feeder line controller electrically coupled to the secondary power transforming station and at least a portion of the multiplicity of power feeder lines;
   providing a plurality of user end smart meters coupled to the at least one power feeder line and a respective plurality of intelligent load receptacles coupled to each of the plurality of user end smart meters, each of the respective plurality of intelligent load receptacles coupled to one of the plurality of user end smart meters being associated with a corresponding household appliance load coupled thereto and transmits a load state detection feedback signal to the one of the plurality of user end smart meters to which it is connected;
   responsive to a requirement to reduce power consumption capacity, the secondary power transforming station transmits a control instruction to the at least one feeder line controller to reduce power consumption capacity of the at least a portion of the multiplicity of power feeder lines connected to the at least one feeder line controller;
   computing, by the at least one feeder line controller, a priority cutoff level responsive to a value of power consumption capacity to be reduced by the at least one feeder line controller and a plurality of load state detection feedback signals received from the plurality of user end smart meters;
   storing, in advance, digital code data in each of the respective plurality of intelligent load receptacles, the digital code data including data associated with the respective household appliance load coupled thereto;
   transmitting a user end load power cutoff control signal including the computed priority cutoff level through the at least one feeder line to the plurality of user end smart meters coupled thereto using a power line communication protocol;
   detecting and receiving the user end load power cutoff control signal at each of the plurality of user end smart meters, detecting the load power cutoff control signal includes periodically scanning a power line input by each of the plurality of user end smart meters for the load power cutoff control signal transmitted using the power line communication protocol through the at least one feeder line;
   determining, by each of the plurality of user end smart meters, whether collectively the respective household appliance loads associated with the plurality of intelligent load receptacles coupled thereto reaches the computed priority cutoff level of the user end load power cutoff control signal based on an the plurality of load state detection feedback signals received from the plurality of intelligent load receptacles, and for any of the plurality of user end smart meters determining the computed priority cutoff level has been reached, transmitting therefrom user end load power cutoff control signal to the respective plurality of intelligent load receptacles coupled thereto, and for any of the plurality of user end smart meters determining the computed priority cutoff level has not been reached, transmitting to the at least one feeder line controller, the plurality of load state detection signal received from the plurality of intelligent load receptacles respectively coupled thereto;

determining by each of the respective plurality of intelligent load receptacles whether the stored priority cutoff level for the corresponding household appliance load associated therewith reaches the computed priority cutoff level responsive to receipt of the digital code data and data fields thereof, the data fields of the digital code data including a secondary power transforming station code, a power supply feeder line serial number code, a smart meter brand/model code, a smart meter serial number code, a priority cutoff level code, an intelligent load receptacle code, a household load model code, and a household load serial number code, if the stored priority cutoff level of any one of the respective plurality of intelligent load receptacles is equal to or greater than computed priority cutoff level, the one of the respective plurality of intelligent load receptacles cuts off power supplied to the corresponding household appliance load associated therewith, otherwise, continuing to supply power to the corresponding household appliance load associated therewith;

transmitting from each of the respective plurality of intelligent load receptacles to the one of the plurality of user end smart meters, the load detection feedback signal containing a state of each of the plurality of intelligent load receptacles respectively coupled thereto; and evaluating the a reduction in power consumption capacity by the at least one feeder line controller based on the load detection feedback signal containing a state of each of the plurality of intelligent load receptacles respectively coupled to each of the plurality of user end smart meters, and adjusting the computed priority cutoff level up or down to achieve the value of power consumption capacity to be reduced.

\* \* \* \* \*